(12) United States Patent
Martin et al.

(10) Patent No.: US 8,432,864 B1
(45) Date of Patent: Apr. 30, 2013

(54) METHODS AND APPARATUSES FOR OVERRIDING COMMON ENHANCED DEDICATED CHANNEL RESOURCE SELECTION

(75) Inventors: Brian Martin, Farnham (GB); Keiichi Kubota, Weybridge (GB)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/291,799

(22) Filed: Nov. 8, 2011

(30) Foreign Application Priority Data

Nov. 7, 2011 (GB) .................................. 1119133.5

(51) Int. Cl.
*H04W 4/00* (2009.01)
(52) U.S. Cl.
USPC .......................................................... 370/329
(58) Field of Classification Search ........................ None
See application file for complete search history.

(56) References Cited

U.S. PATENT DOCUMENTS

| | | | | |
|---|---|---|---|---|
| 6,078,959 | A * | 6/2000 | Wright et al. | 709/227 |
| 2005/0207340 | A1 * | 9/2005 | O'Neill | 370/230 |
| 2009/0238090 | A1 * | 9/2009 | Sambhwani et al. | 370/252 |
| 2012/0093145 | A1 * | 4/2012 | Anchan et al. | 370/352 |

FOREIGN PATENT DOCUMENTS

| | | |
|---|---|---|
| CN | 101174886 A | 5/2008 |
| EP | 2139247 A1 | 12/2009 |
| WO | WO 2009/088858 A1 | 7/2009 |
| WO | WO 2012/131637 A1 | 10/2012 |

OTHER PUBLICATIONS

Martin, Brian, et al., "Method and Apparatus for Modifying Resource Allocation," U.S. Appl. No. 13/251,376, filed Oct. 3, 2011, 36 pages, USA.
Martin, Brian, et al., "Method and Apparatus for Communicating Hidden Common Enhanced Dedicated Channel Resources," U.S. Appl. No. 13/251,685, filed Oct. 3, 2011, 45 pages, USA.
3rd Generation Partnership Project Members, "3GPP Technical Specification Group Radio Access Network, Physical Layer Procedures (FDD) Release 10," 3GPP TS 25.214, Sep. 2011, 100 pages, v.10.4.0, France.
European Telecommunications Standards Institute Members, "Universal Mobile Telecommunications System (UMTS), Radio Resource Control (RRC), Protocol Specification," ETSI TS 125 331 v11.3.0, a.k.a. 3GPP TS 25.331 v11.3.0, Release 11, Nov. 2012, 1998 pages, France.

(Continued)

*Primary Examiner* — Raj Jain
(74) *Attorney, Agent, or Firm* — Alston & Bird LLP

(57) ABSTRACT

A method, apparatus and computer program product are provided for overriding requests for a selected communication resource and indicating a different resource(s) for communication. A method and apparatus may select a communication channel resource type associated with a first set of resources based in part on determining that a predetermined condition is met and may provide a message, to a network device, requesting usage of the selected communication channel resource type. The method and apparatus may also receive a response, from the network device, denying the request for the selected communication channel resource type. The method and apparatus may also cause selection of another communication channel resource type associated with a second set of resources and providing a generated request to the network device requesting usage of the second type of communication channel resource type.

42 Claims, 6 Drawing Sheets

OTHER PUBLICATIONS

3rd Generation Partnership Project Members, "3GPP TSG-RAN WG2 Meeting #75bi, on UE Autonomous RACH Fallback," Oct. 10-14, 2011, 3 pages, Meeting Report No. R2-115098, China.

3rd Generation Partnership Project Members, "3GPP TSG-RAN WG2 Meeting #75bis, Discussions on Solution of Fallback on R99 PRACH," Oct. 10-14, 2011, 3 pages, Meeting Report No. R2-114998, China.

3rd Generation Partnership Project Members, "3GPP TSG-RAN WG2 Meeting #75bis, Support Concurrent Deployment of 2ms and 10ms TTI," Oct. 10-14, 2011, 3 pages, Meeting Report R2-115274, China.

3rd Generation Partnership Project Members, "3GPP TSG RAN WG2 Meeting #75-BIS, On Concurrent Deployment of 2ms and 10ms TTI in a cell in CELL_FACH," Oct. 10-14, 2012, 17 pages, Meeting Report R2-114932, China.

Search and Examination Report for Great Britain Application No. 1119133.5, dated Feb. 29, 2012.

Skoutas, Dimitrios; Komnakos, Dimitrios; Vouyioukas, Demosthenes; and Rouskas, Angelos, "Enhanced Dedicated Channel Scheduling Optimization in WCDMA", 2008 European Wireless Conference (EW), published 2008, pp. 1-5, IEEE, Greece.

Alcatel-Lucent, et al., "3GPP TSG-RAN WG2 Meeting #75bis, Agenda Item 10.1.3, On The Common E-DCH Resource In 2/10 ms TTI Concurrent Operation," 3rd Generation Partnership Project, Oct. 10-14, 2011, Meeting Report No. R2-115097, 3 pages, China.

QUALCOMM Incorporated, "3GPP TSG RAN WG2 Meeting #74, Agenda Item 10.1.2, Supporting Concurrent Deployment Of 2ms and 10ms TTI In A Cell In CELL_FACH," 3rd Generation Partnership Project, May 9-13, 2011, Meeting Report No. R2-112854, 2 pages, Spain.

Huawei, et al., "3GPP TSG RAN WG2 Meeting #75, Agenda Item 10.1.3, Support Concurrent Deployment Of 2ms And 10ms TTI In A Cell," 3rd Generation Partnership Project, Aug. 22-26, 2011, Meeting Report R2-113968, 3 pages, Greece.

Renesas Mobile Europe Ltd, "3GPP TSG-RAN WG2 Meeting # 77, Agenda Item 10.1.3, Initial TTI Selection For 2ms/10ms Concurrent Deployment In CELL_FACH," 3rd Generation Partnership Project, Feb. 6-10, 2013, Meeting Report R2-120562, 5 pages, Germany.

International Searching Authority, International Search Report and Written Opinion for International Application No. PCT/IB2012/056226, Feb. 26, 2013, 15 pages, European Patent Office, The Netherlands.

* cited by examiner

METHODS AND APPARATUSES FOR OVERRIDING COMMON ENHANCED DEDICATED CHANNEL RESOURCE SELECTION

CROSS-REFERENCE TO RELATED APPLICATIONS

This application claims priority to Great Britain (GB) Application No. 1119133.5 filed Nov. 7, 2011 which is hereby incorporated herein in its entirety by reference.

TECHNOLOGICAL FIELD

Embodiments of the present invention relate generally to communications technology and, more particularly, to a method and apparatus for overriding a selection of common enhanced dedicated channel resources.

BACKGROUND

The communications between a mobile terminal and a serving cell, such as the uplink communications from the mobile terminal to the serving cell, may sometimes affect resource utilization, throughput, latency and coverage. To enhance uplink communications improvements, the ongoing evolution of wireless communications systems such as, for example, the enhanced dedicated channel (E-DCH) in cell Forward Access Channel (FACH) (CELL_FACH) state feature was introduced into wireless standard specifications, such as the third generation partnership project (3GGP) Release 8 specifications.

Mobile terminals operating in a CELL_FACH mode may use a contention based E-DCH channel for uplink (UL) transmission rather than a traditional random access channel (RACH). The contention-based E-DCH channel allows for mobile terminals to transfer signaling and data at significantly higher data rates and for longer durations, which reduces transfer and state transition delays.

Support for concurrent deployment of transmission time interval (TTI) settings, (e.g., 2 millisecond (ms) and 10 ms), will be allowed for the common E-DCH in the CELL_FACH state. In this regard, the common E-DCH in the CELL_FACH state will support concurrent deployment of 2 ms and 10 ms TTI settings in a cell in 3GPP Rel-11. A single TTI setting, which may be determined and broadcast by a communications network, may be used by mobile terminals accessing the E-DCH in the CELL_FACH state within a particular cell. In this regard, for example, mobile terminals may utilize 2 ms TTIs and/or 10 ms TTIs in a cell. While a smaller TTI, such as the 2 ms TTI, may be more advantageous from fast scheduling and latency standpoints, a larger TTI, such as the 10 ms TTI, may be more widely utilized by mobile terminals in a cell to reliably transfer signaling and data to the network, particularly in coverage limited scenarios.

Although a mobile terminal may select a particular TTI (e.g., a 2 ms TTI or a 10 ms TTI) to utilize for traffic of a Dedicated Control Channel (DCCH)/Dedicated Traffic Channel (DTCH), a network may override or deny the selection of the mobile terminal. For example, the selection of the TTI by the mobile terminal may be denied in an instance in which the network determines that the selected TTI is unavailable for usage (e.g., the selected TTI is being utilized by other mobile terminals) or for other reasons. At present, the request for a 2 ms TTI may be overridden by a network by providing an indicator to the mobile terminal corresponding to a different resource (e.g., a 10 ms TTI). However, a drawback of this approach is that it restricts the total number of resources that may be used to 32 resources (e.g., a mixture of up to 32 10 ms or 2 ms TTI resources). For instance, this approach typically only allows the network to provide up to 32 resources to the mobile terminal for communication. However, it may be beneficial to provide more than 32 resources to a mobile terminal, for instance, in overloaded cells in which the availability of some resources may be constrained.

In view of the foregoing drawbacks, a more reliable and efficient manner of overriding a selection of resources may be beneficial.

BRIEF SUMMARY

A method, apparatus and computer program product are therefore provided according to an example embodiment in order to provide an efficient and reliable manner for overriding a selection of a resource and providing a designated resource or set of resources for usage to facilitate communications.

The example embodiments may provide an efficient and reliable manner in which to enable a network device to reject/override a selected resource such as, for example, 2 ms TTI resource request and may indicate/designate to a mobile terminal to select a different resource (e.g., a 10 ms TTI resource) or a resource from one or more alternative sets of resources (up to 32 resources per set) without introducing new signaling on a channel (e.g., a High Speed Shared Control Channel (HS-SCCH)).

Additionally, the exemplary embodiments may designate/indicate multiple sets of resources on different scrambling codes from which the mobile terminal may select a resource in response to the network device denying a request for a selected resource. As such, the exemplary embodiments may not impose any restriction on the number of resources (e.g., common E-DCH resources) that may be used/selected for facilitating communications.

In one example embodiment, a method is provided that causing a selection of a communication channel resource type associated with a first set of resources based in part on determining that a predetermined condition is met. The method may further include enabling provision of a generated message to a network device. The message may request usage of the selected communication channel resource type. The method may further include receiving a response, from the network device, denoting denial of the request for the usage of the selected communication channel resource type. The method may further include causing a selection of another communication channel resource type associated with a second set of resources, and enabling provision of a generated request to the network device. The generated request may request usage of the another communication channel resource type.

In another example embodiment, an apparatus is provided that includes at least one processor and at least one memory including computer program code with the at least one memory and the computer program code being configured to, with the at least one processor, cause the apparatus at least to cause selection of a communication channel resource type associated with a first set of resources based in part on determining that a predetermined condition is met. The at least one memory and the computer program code are also configured to, with the at least one processor, cause the apparatus to enable provision of a generated message to a network device. The generated message may request usage of the selected communication channel resource type. The at least one memory and the computer program code are also configured to, with the at least one processor, cause the apparatus to receive a response, from the network device, denoting denial of the request for the usage of the selected communication channel resource type. The at least one memory and the computer program code are also configured to, with the at least one processor, cause the apparatus to cause selection of another communication channel resource type associated with a second set of resources, and enable provision of a generated request, to the network device. The generated request may request usage of the another communication channel resource type.

In one example embodiment, an apparatus includes means for causing a selection of a communication channel resource type associated with a first set of resources based in part on determining that a predetermined condition is met. The apparatus may also include means for enabling provision of a generated message to a network device. The message may request usage of the selected communication channel resource type. The apparatus may also include means for receiving a response, from the network device, denoting denial of the request for the usage of the selected communication channel resource type. The apparatus may also include means for causing a selection of another communication channel resource type associated with a second set of resources, and enabling provision of a generated request to the network device. The generated request may request usage of the another communication channel resource type.

In one example embodiment, a method is provided that receives a message, from a device, indicating a selection of a communication channel resource type associated with a first set of resources in which the device determined that a predetermined condition is met. The message may include data requesting usage of the selected communication channel resource type. The method may further include enabling provision of a generated message, to the device, denoting denial of the request for the usage of the selected communication channel type. The method may further include receiving a response message from the device indicating a selection of another communication channel resource type, by the device, associated with a second set of resources in response to the denial. The response message may include data requesting usage of the another communication channel resource type.

In one example embodiment, an apparatus is provided that includes at least one processor and at least one memory including computer program code with the at least one memory and the computer program code being configured to, with the at least one processor, cause the apparatus at least to receive a message, from a device, indicating a selection of a communication channel resource type associated with a first set of resources in which the device determined that a predetermined condition is met. The message may include data requesting usage of the selected communication channel resource type. The at least one memory and the computer program code are also configured to, with the at least one processor, cause the apparatus to enable provision of a generated message, to the device, denoting denial of the request for the usage of the selected communication channel type. The at least one memory and the computer program code are also configured to, with the at least one processor, cause the apparatus to receive a response message from the device indicating a selection of another communication channel resource type, by the device, associated with a second set of resources in response to the denial. The response message may include data requesting usage of the another communication channel resource type.

In one example embodiment, an apparatus is provided that includes means for receiving a message, from a device, indicating a selection of a communication channel resource type associated with a first set of resources in which the device determined that a predetermined condition is met. The message may include data requesting usage of the selected communication channel resource type. The apparatus may also include means for enabling provision of a generated message, to the device, denoting denial of the request for the usage of the selected communication channel resource type. The apparatus may also include means for receiving a response message from the device indicating a selection of another communication channel resource type, by the device, associated with a second set of resources in response to the denial. The response message may include data requesting usage of the another communication channel resource type.

BRIEF DESCRIPTION OF THE SEVERAL VIEWS OF THE DRAWINGS

Figure 1:
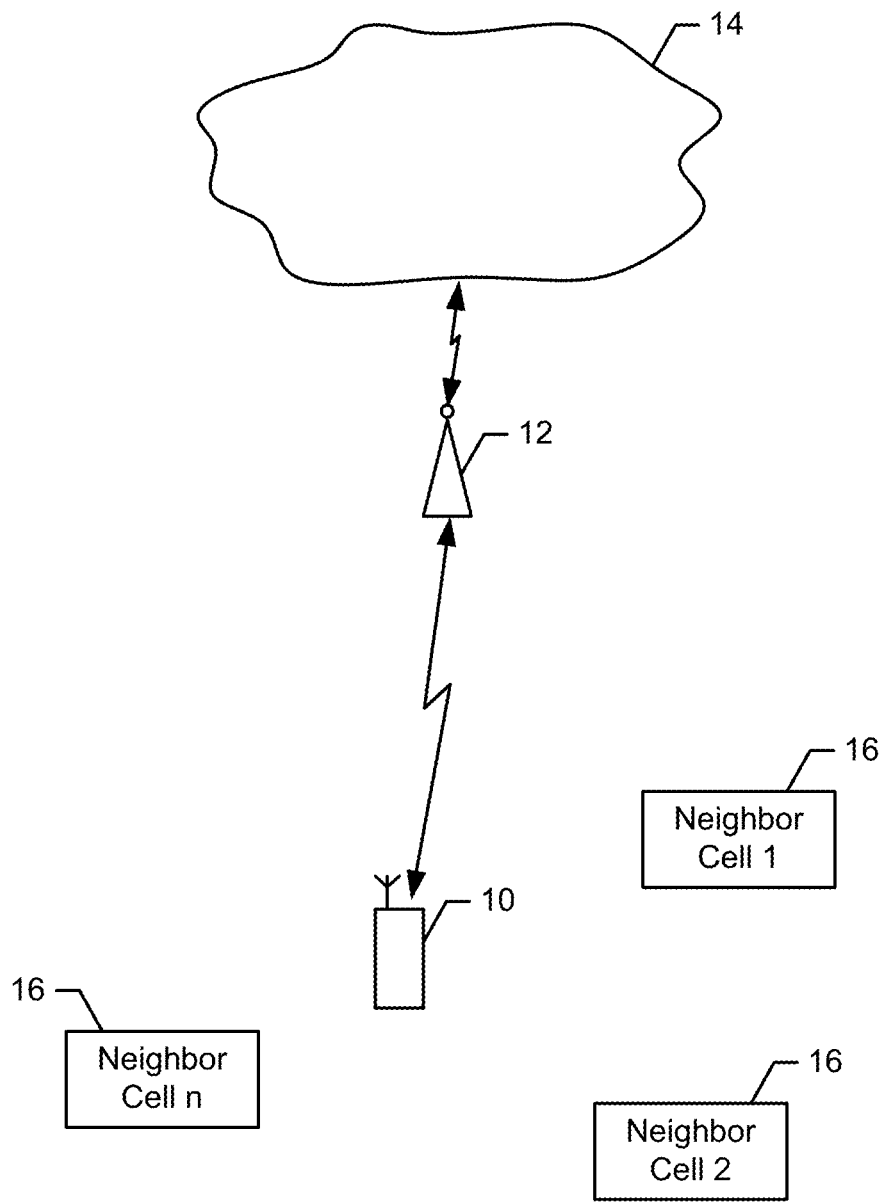
Figure 2:
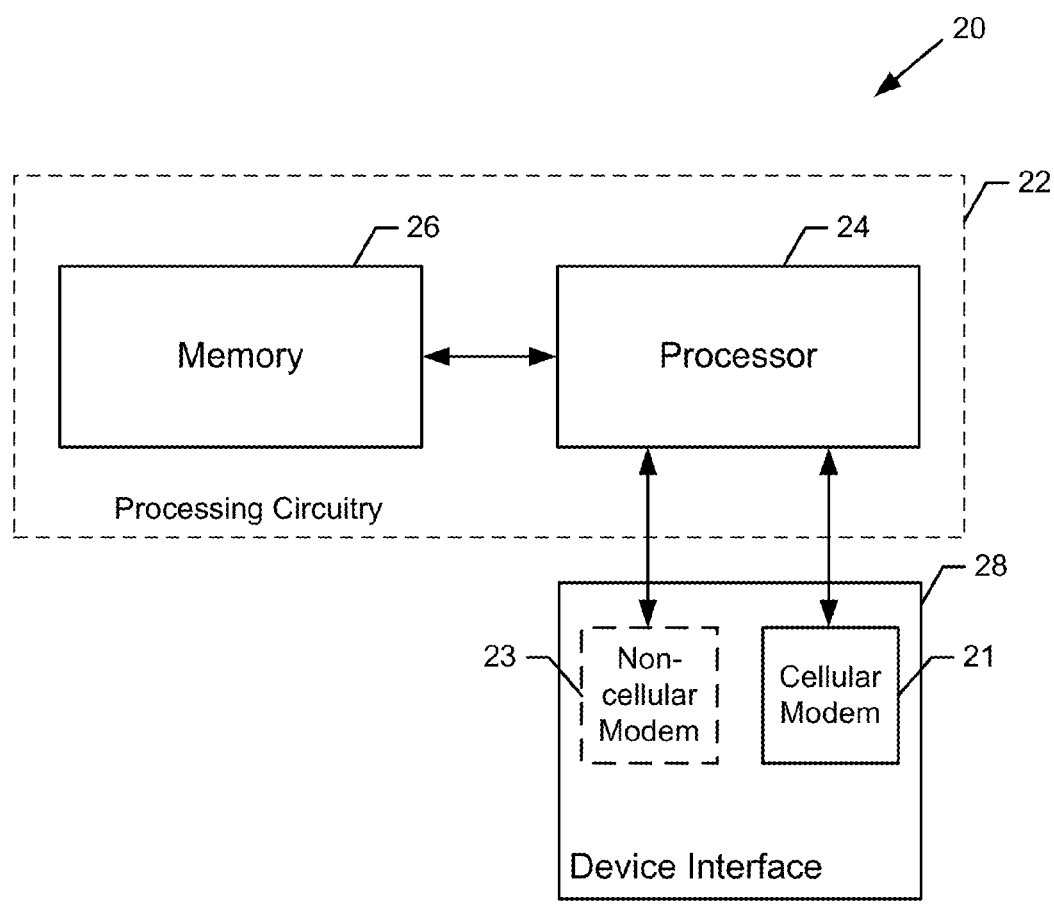
Figure 3:
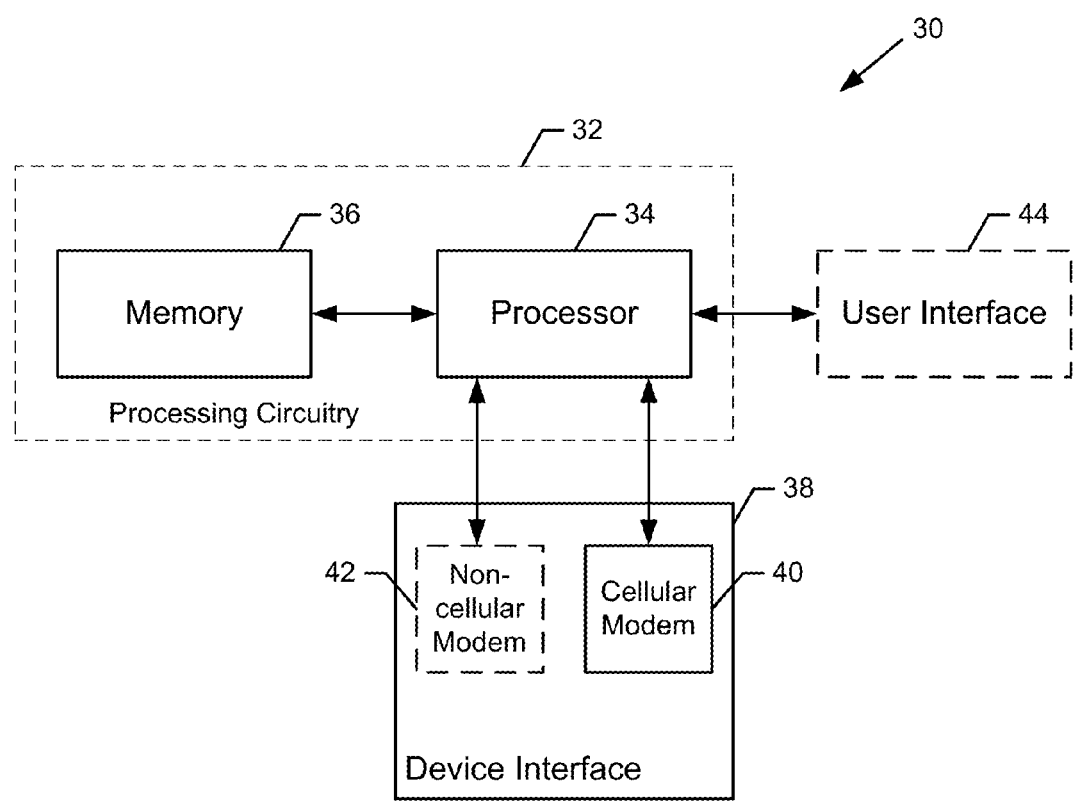
Figure 4:
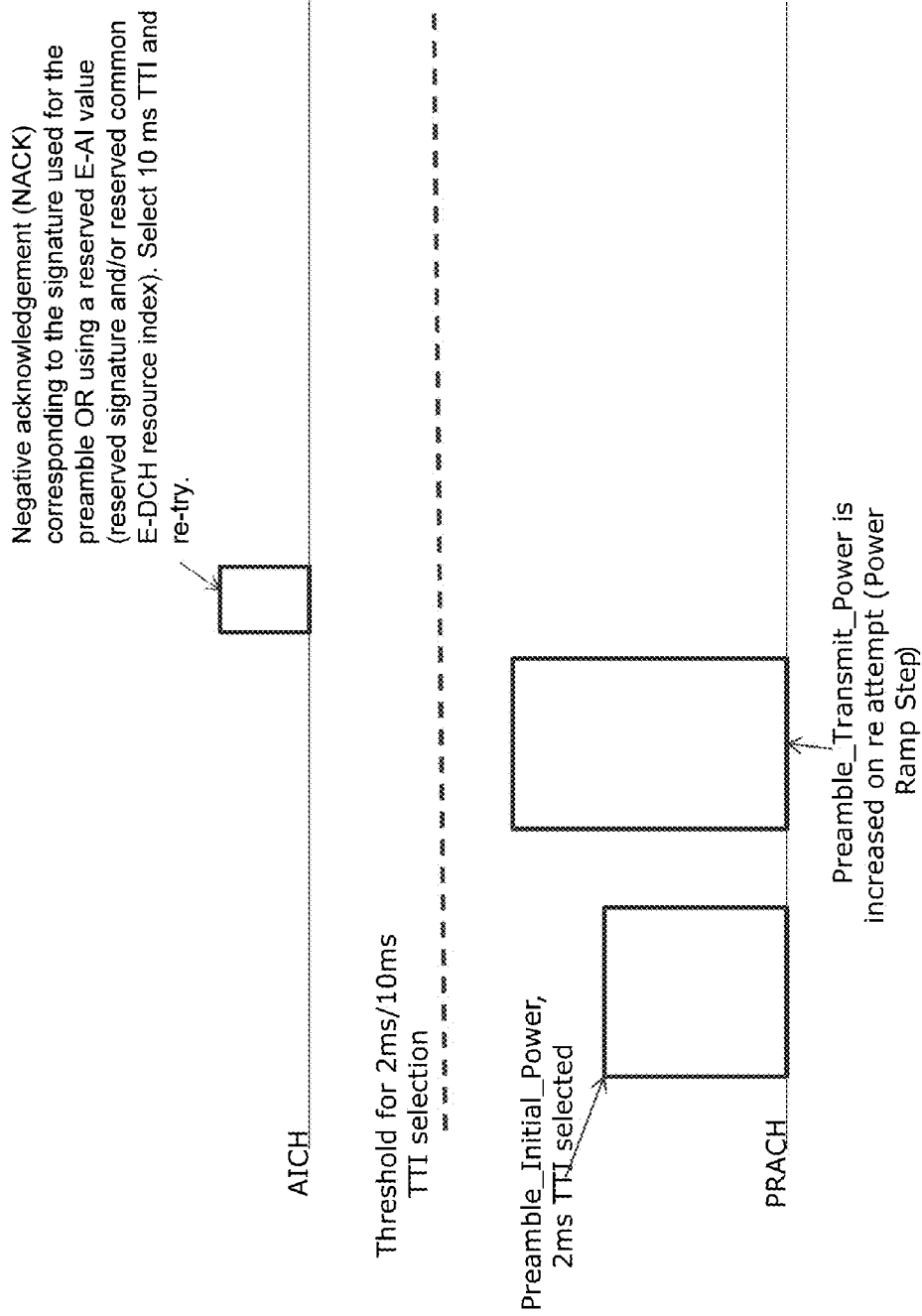
Figure 5:
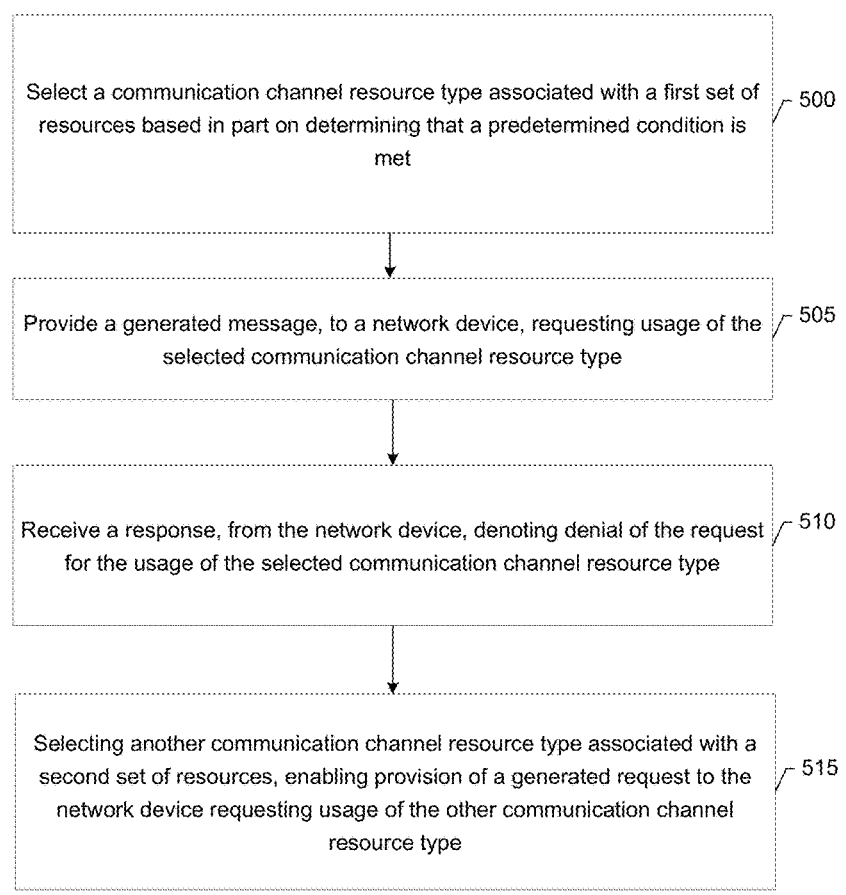
Figure 6:
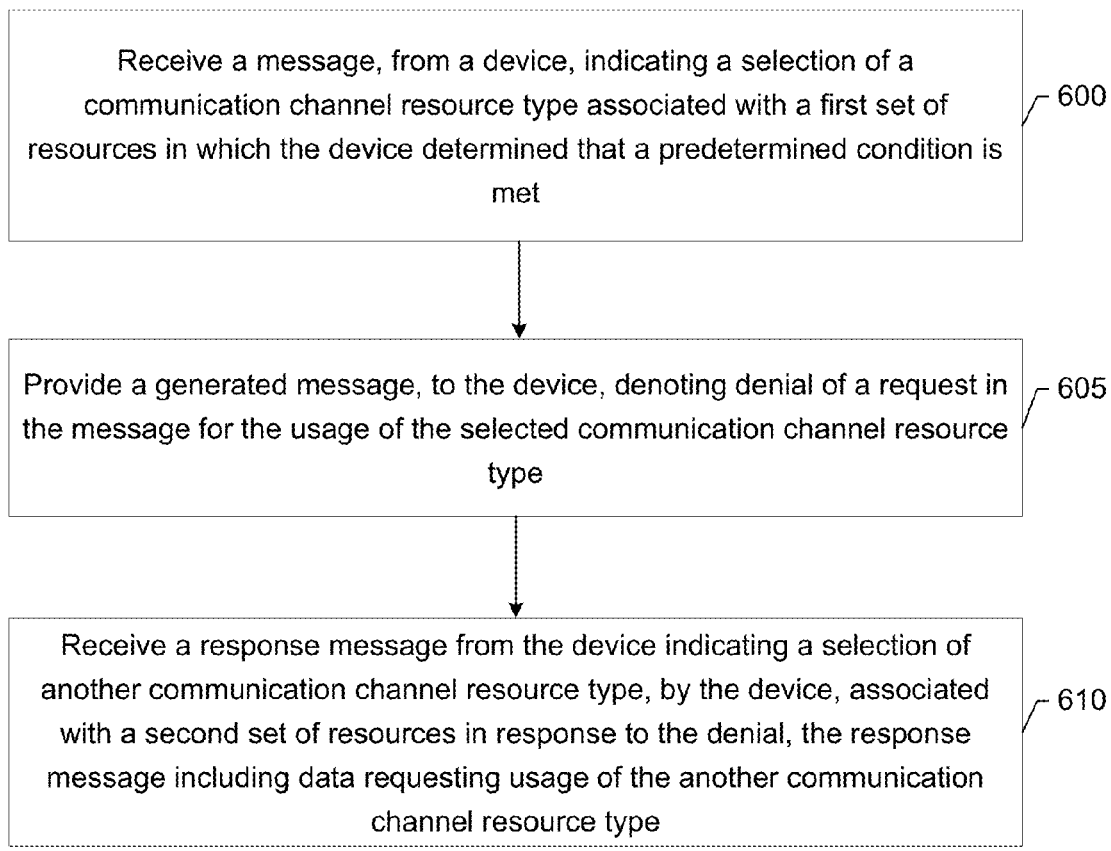

Having thus described the invention in general terms, reference will now be made to the accompanying drawings, which are not necessarily drawn to scale, and wherein:

FIG. 1 is a schematic representation of a system that may benefit from an example embodiment of the invention;

FIG. 2 is a schematic block diagram of an apparatus from the perspective of a base station in accordance with an example embodiment of the invention;

FIG. 3 is a block diagram of an apparatus that may be embodied by a mobile terminal in accordance with an example embodiment of the invention;

FIG. 4 is a diagram illustrating operations performed in accordance with one example embodiment of the invention;

FIG. 5 is a flowchart illustrating operations performed in accordance with one example embodiment of the invention; and FIG. 6 is a flowchart of operations performed in accordance with another example embodiment of the invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a scrambling code(s) may, but need not, denote a manner in which one or more mobile terminals (e.g., User Equipment (UE)) and/or network devices (e.g., a base station(s), access point(s), radio network controller(s) (RNCs), etc.) differentiate between different physical signals on a same frequency. In some example embodiments, a set of resources may be associated with or linked to each scrambling code.

As referred to herein, a signature(s) may, but need not, denote a manner in which one or more mobile terminals and/or network devices identify one or more best resources for selection to differentiate between different mobile terminal (e.g., UE) signals. In an example embodiment there may be 16 PRACH signatures. A mobile terminal (e.g., a UE) may select one of the 16 signatures to send a PRACH preamble to a network. In response, the network may respond using the same signature (e.g., the signature may identify that a command for resource allocation is for the device (e.g., the mobile terminal) making the request for a resource) using an acquisition indicator channel (AICH), and along with the signature indicates a modulation symbol (e.g., one out of a maximum of 32 resources (with a NACK/ACK)). As such, the combination of a signature and a modulation symbol (e.g., an extended acquisition indicator (E-AI) modulation symbol) may pair the mobile terminal with the resource.

As described above, it may be beneficial to provide more than 32 resources to a mobile terminal, for example, in overloaded cells in which the availability of some resources may be constrained. Additionally, the procedure of overriding a selected resource and providing an indicator to utilize a different resource may typically only be used for switching between a requested 2 ms TTI and a 10 ms TTI to be utilized by the mobile terminal for communication. This may be a drawback since there may be instances in which it is impractical/undesirable for the network to provide a 2 ms TTI or a 10 ms TTI resource to the mobile terminal for communication. For instance, there may not be any 2 ms TTI or 10 ms TTI resources available and it may be desirable for a UE to communicate via a PRACH channel. As such, some example embodiments may provide a manner in which the mobile terminal may communicate via some other resource(s) provided by the network and provide a more reliable and efficient manner of overriding a selection of resources.

A method, apparatus and computer program product of an example embodiment are therefore provided for efficiently and reliably overriding a selection of resources and enabling provision of other resources for selection to facilitate communications. In accordance with an example embodiment, a network device may determine whether a request by a mobile terminal (e.g., UE) for a resource such as, for example, a 2 ms common communication channel resource (also referred to herein as a 2 ms TTI resource or 2 ms common resource) associated with a particular timing parameter (e.g., a 2 ms TTI) provided to a base station (e.g., Node B) should be overridden by the network device. In this regard, in an instance in which the network device determines to override the selected resource the network device may provide an indication of one or more resources to the mobile terminal to enable the mobile terminal to select one of the resources. In an example embodiment, the network device may not necessarily override a request of a mobile terminal sent to the network device for a 10 ms common communication channel resource (also referred to herein as 10 ms TTI resource or 10 ms common resource) associated with a particular timing parameter (e.g., a 10 ms TTI) with an allocation of a 2 ms TTI resource since the mobile terminal initially determined that selection of the 2 ms TTI resource was unsuitable. For instance, the mobile terminal may determine that radio conditions in a corresponding cell (e.g., a serving cell) may be too unreliable to utilize the 2 ms TTI resource and instead may send a request for a selected 10 ms TTI resource to the network device to facilitate communications.

Referring now to FIG. 1, a system according to an example embodiment is provided. The system of FIG. 1 includes a first communication device (e.g., mobile terminal 10) that is capable of communication via a serving cell 12, such as a base station, a Node B, an evolved Node B (eNB), a radio network controller (RNC) or other access point, with a network 14 (e.g., a core network). While the network may be configured in accordance with Universal Mobile Telecommunications System (UMTS), Long Term Evolution (LTE) or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

The network 14 may include a collection of various different nodes, devices or functions that may be in communication with each other via corresponding wired and/or wireless interfaces. For example, the network may include one or more cells, including serving cell 12 and one or more neighbor cells 16 (designated neighbor cell 1, neighbor cell 2, . . . neighbor cell n in the embodiment of FIG. 1), each of which may serve a respective coverage area. The serving cell and the neighbor cells could be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also referred to herein as User Equipment (UE) 10), may be in communication with other communication devices or other devices via the serving cell 12 and, in turn, the network 14. In some cases, the communication device may include an antenna for transmitting signals to and for receiving signals from a serving cell.

In some example embodiments, the mobile terminal 10 may be a mobile communication device such as, for example, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 14.

In one embodiment, for example, a neighbor cell 16 (also referred to herein as target cell 16) and/or the serving cell 12 (also referred to herein as Node B 12) may be embodied as or otherwise include an apparatus 20 as generically represented by the block diagram of FIG. 2. Additionally, in one example embodiment, the mobile terminal 10 may be embodied as or otherwise include an apparatus 30 as generically represented by the block diagram of FIG. 3. While the apparatus 20 may be employed, for example, by a serving cell 12, or a neighbor cell 16 and the apparatus 30 may be employed, for example, by a mobile terminal 10, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the invention. In some example embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 may include a processor 24 and memory 26 that may be in communication with or otherwise control a device interface 28. As such, the processing circuitry may be embodied as a circuit chip (e.g., an integrated circuit chip) configured (e.g., with hardware, software or a combination of hardware and software) to perform operations described herein in relation to the apparatus 20.

The device interface 28 may include one or more interface mechanisms for enabling communication with other devices, such as one or more mobile terminals 10. In some cases, the device interface may be any means such as a device or circuitry embodied in either hardware, or a combination of hardware and software that is configured to receive and/or transmit data from/to a network and/or any other device or module in communication with the processing circuitry 22. In this regard, the device interface may include, for example, an antenna (or multiple antennas) and supporting hardware and/or software for enabling communications with a wireless communication network and/or a communication modem, such as a cellular modem 21 (e.g., a UMTS modem), and/or an optional non-cellular modem 23 (e.g., a WiFi modem, WLAN modem, etc.) for enabling communications with other terminals (e.g., WiFi terminals, WLAN terminals, APs, etc).

In an example embodiment, the memory 26 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In one embodiment, the mobile terminals 10 may be embodied as or otherwise include an apparatus 30 as generically represented by the block diagram of FIG. 3. In this regard, the apparatus may be configured to provide for communications with the Node B 12 or another terminal(s) via communications system (e.g., a UMTS). While the apparatus may be employed, for example, by a mobile terminal, it should be noted that the components, devices or elements described below may not be mandatory and thus some may be omitted in certain embodiments. Additionally, some embodiments may include further or different components, devices or elements beyond those shown and described herein.

As shown in FIG. 3, the apparatus 30 may include or otherwise be in communication with processing circuitry 32 that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 32 may include a processor 34 and memory 36 that may be in communication with or otherwise control a device interface 38 and, in some cases, a user interface 44. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal, the processing circuitry may be embodied as a portion of a mobile computing device or other mobile terminal.

The optional user interface 44 may be in communication with the processing circuitry 32 to receive an indication of a user input at the user interface and/or to provide an audible, visual, mechanical or other output to the user. As such, the user interface in the context of a mobile terminal may include, for example, a keyboard, a mouse, a joystick, a display, a touch screen, a microphone, a speaker, and/or other input/output mechanisms.

The device interface 38 may include one or more interface mechanisms for enabling communication with other devices and/or networks. In some cases, the device interface may be any means such as a device or circuitry embodied in either hardware, or a combination of hardware and software that is configured to receive and/or transmit data from/to a network and/or any other device or module in communication with the processing circuitry 32. In this regard, the device interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In the illustrated embodiment, for example, the device interface includes a cellular modem 40 (e.g., a UMTS modem) for supporting communications with the Node B 12 and an optional non-cellular modem 42 (e.g., a WiFi modem, WLAN modem, Bluetooth (BT) modem, etc.) for supporting communications with other terminals (e.g., a WiFi station(s), a WLAN station(s)), etc.).

In an example embodiment, the memory 36 may include one or more non-transitory memory devices such as, for example, volatile and/or non-volatile memory that may be either fixed or removable. The memory may be configured to store information, data, applications, instructions or the like for enabling the apparatus 30 to carry out various functions in accordance with example embodiments of the present invention. For example, the memory could be configured to buffer input data for processing by the processor 34. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 34 may be embodied in a number of different ways. For example, the processor may be embodied as various processing means such as one or more of a microprocessor or other processing element, a coprocessor, a controller or various other computing or processing devices including integrated circuits such as, for example, an ASIC, an FPGA or the like. In an example embodiment, the processor may be configured to execute instructions stored in the memory 36 or otherwise accessible to the processor. As such, whether configured by hardware or by a combination of hardware and software, the processor may represent an entity (e.g., physically embodied in circuitry—in the form of processing circuitry 32) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

In an example embodiment, a UE 10 may select a common enhanced dedicated channel (E-DCH) resource such as, for example, a 2 ms TTI resource (e.g., 2 ms common communication channel resource associated with a particular timing parameter (e.g., a 2 ms TTI) (e.g., a first type of resource)) to communicate data based in part on predetermined criteria. In an example embodiment, the predetermined criteria may correspond to a predetermined threshold. The predetermined threshold may be a predetermined power threshold (e.g., initial uplink random access channel (RACH) preamble power), a predetermined amount of data in a buffer of a memory (e.g., memory 36) of the UE 10 to be sent to the Node B 12 via an uplink communication, or any other suitable threshold.

For purposes of illustration and not of limitation, a processor 34 of the UE 10 may measure its uplink power and in response to determining that the measured uplink power is below the predetermined threshold (e.g., an initial uplink RACH preamble power threshold), the processor 34 of the UE 10 may select the 2 ms TTI resource to utilize for communications. In an instance in which the measured uplink power is below the threshold, the processor 34 of the UE 10 may determine that the UE 10 is experiencing good radio conditions (e.g., located in/near the center of a serving cell) and as such may select the 2 ms TTI resource which may require better radio conditions than the 10 ms TTI resource in order to facilitate faster data transfer, for example. On the other hand, the processor 34 of the UE 10 may select a 10 ms TTI resource (e.g., 10 ms common communication channel resource associated with a particular timing parameter (e.g., a 10 ms TTI) (e.g., a second type of resource)) in an instance in which the uplink power measured by the processor 34 of the UE 10 is above the predetermined threshold (e.g., the initial uplink RACH preamble power threshold).

As another example, in an instance in which the processor 34 of the UE 10 determines that the amount of data buffering in memory 36 for sending via an uplink communication to the Node B 12 is above a predetermined threshold, the UE 10 may select a resource such as, for example, a 2 ms TTI resource. In contrast, in an instance in which the processor 34 of the UE 10 determines that the amount of data buffering in memory 36 for sending via an uplink communication to the Node B 12 is below the predetermined threshold, the processor may select a resource such as, for example, a 10 ms TTI resource.

As described above, in an instance in which the processor 34 of the UE 10 determines that the UE 10 meets the predetermined criteria (e.g., a predetermined threshold) such as, for example, a measurement (e.g., uplink power measurement, measurement of an amount of data buffering for uplink, etc.) being below a predetermined threshold, the processor 34 of the UE 10 may select the 2 ms TTI resource. In this regard, the processor 34 may select the 2 ms TTI resource and may send a request for the selected resource to the Node B 12. In an instance in which the Node B 12 determines that it is acceptable to provide the selected 2 ms TTI resource to the UE 10, the processor 24 of the Node B 12 may send or broadcast the 2 ms TTI resource to the UE 10 for facilitating communications.

On the other hand, in this example embodiment, in an instance in which the Node B determines not to provide the requested resource (e.g., the 2 ms TTI resource) to the UE 10, the Node B 12 may (1) send an Extended Acquisition Indicator (E-AI) with a signature and modulation symbol corresponding to a negative acknowledgment (NACK) on an Enhanced Acquisition Indicator Channel (E-AICH) to the UE 10 or (2) may send an E-AI with a signature and modulation symbol corresponding to a reserved or predefined E-DCH resource index or signature (also referred to herein as E-AI value or NACK) on the E-AICH to the UE 10. The processor 34 of the Node B 12 may determine that it is impractical/undesirable to provide the requested resource to the UE 10, for example, in an instance in which the processor 34 determines the requested resource (e.g., the 2 ms TTI resource) is unavailable (e.g., the requested resource is currently being utilized by other UEs of a serving cell). As another example, the processor 34 of the Node B 12 may determine that it is impractical/undesirable to provide the requested resource the UE 10, for example, in an instance in which the processor 34 determines that the uplink power as calculated by the UE 10 is not providing as good a signal at the Node B 12 as expected, or for any other suitable reasons.

In one example embodiment, in response to receipt of the NACK, the processor 34 of the UE 10 may interpret the NACK as instructing the UE 10 to exit or abort (also referred to herein as fallback) the current PRACH procedure associated with the selection of the 2 ms TTI resource, for example and to select another resource previously (e.g., preconfigured) indicated (e.g., 10 ms TTI resource) by the Node B 12 and stored by the UE 10. For example, in an instance in which the UE 10 receives a NACK, the UE 10 may abort a current PRACH procedure, and select from a different set of resources previously indicated/provided to the UE 10 by the Node B 12. As such, the UE 10 may select another resource from the previously provided set of resources and may send a request for this selected resource to the Node B 12 to determine whether the Node B 12 may allow the UE 10 to utilize this resource. The resource(s) indicated (e.g., 10 ms TTI resource) by the Node B 12 for selection by the UE 10 may be previously provided by the Node B 12 to the UE 10 in the following manner. In one example embodiment, the Node B 12 may utilize a broadcast control channel (BCCH) or alternatively a dedicated control channel (DCCH) to send a list of common channel configurations to the UE 10. The common channel configurations may be, for example, a set of 32 10 ms TTI resources, another set of 32 2 ms TTI resources or any other resource(s). In another example embodiment, an E-AI value sent from the Node B 12 may identify an index indicating which of the configurations the UE 10 is to utilize, in response to a preamble being sent by the UE 10 to the Node B 12. In an example embodiment, the preamble may be sent by the UE 10 on a PRACH to the Node B 12. In response to receipt of a selection of the resource indicated by the Node B 12 to the UE 10, the processor 24 of the Node B may provide the indicated resource to the UE 10 to enable the UE 10 to utilize the resource (e.g., a 10 ms TTI resource) to facilitate communications (e.g., uplink communications).

In this example embodiment, to facilitate sending of the NACK message, the Node B 12 may send an E-AI value corresponding to the signature (e.g., the 2 ms TTI resource) which the UE 10 selected or a reserved signature, in the manner described above.

In some example embodiments, receipt of the NACK message by the UE 10 may invoke some back off time and delay the processor 34 of the UE 10 from accessing or attempting to select the resource indicated by the Node B 12 for a predetermined time period. However, in some other example embodiments, the processor 34 of the UE 10 may attempt to select the resource indicated by the Node B 12 without waiting a predetermined time period.

In another example embodiment, in an instance in which the UE 10 receives an E-AI signature and modulation value corresponding to a reserved or predetermined common E-DCH resource index (e.g., E-AI value) on the E-AICH in response to the UE 10 sending a request for a selected resource (e.g., a 2 ms TTI resource) to the Node B 12, the processor 34 of the UE 10 may detect the reserved E-AI value. In this regard, the processor 34 of the UE 10 may detect the reserved E-AI value as indicating to the UE 10 to fall back or abort the current procedure of requesting the selected resource (e.g., the 2 ms TTI resource). In this example embodiment, one of thirty two E-AI values may be reserved for explicitly indicating the fall back command to the UE 10. In this regard, the E-AI value may, but need not, relate to a NACK message corresponding to a symbol (e.g., a value of a bit (e.g., 0)) that denotes to the processor 34 of the UE 10 to fall back and select a resource from another set of resources (e.g., a set of up to 32 10 ms TTI resources) indicated by the Node B to the UE 10 for selection. The indicated set of resources may be provided by the Node B 12 to the UE 10 via a PRACH.

In response to receipt of a selection of one of the resources from the set of indicated resources, the processor 34 of the Node B 12 may provide the selected resource (e.g., one of the 32 10 ms TTI resources) to the UE 10 to enable the UE to facilitate communications (e.g., uplink communications). In an instance in which the processor 34 of the UE 10 detects the E-AI value, the processor 34 may not need to wait a predetermined time period before reattempting to select a resource indicated by Node B 12.

In one example embodiment, in an instance in which the UE 10 requests a selected 2 ms TTI resource from the Node B 12, and the Node B 12 denies the request (e.g., via a NACK message on the E-AICH), the UE 10 may determine another resource such as, for example, a 10 ms TTI resource to select or may determine a set of resources in which to select one of the resources (e.g., a 10 ms TTI resource) from the set, as described above. In an instance in which the UE 10 requests a selected 10 ms TTI resource from the Node B 12, and the Node B 12 denies the request (e.g., via a NACK message on the E-AICH) when the processor 24 of the Node B 12 determines that there are no 10 ms TTI resources available for the UE 10 to utilize, the UE 10 may select a physical random access channel (PRACH), as a backup channel, for communicating data. In other words, the fallback to use the PRACH may be indicated, for example, in an instance in which there are no 10 ms E-DCH resources available. As such, in some example embodiments fallback may occur from a 2 ms TTI resource request to a 10 ms TTI resource selection. Additionally, fallback may occur from 10 ms TTI resource to a PRACH. In an instance in which more than one E-AI value is reserved, fallback may occur from 2 ms TTI resource to a PRACH.

In another example embodiment, in an instance in which the processor 24 of the Node B 12 detects receipt of a selected request for the UE 10 and determines to deny the request indicating to the UE 10 to abort the current procedure (e.g., a current PRACH procedure), in the manner described above, the processor 24 of the Node B 12 may provide multiple sets of resources on different scrambling codes to the UE 10. The sets of resources linked to or associated with the different scrambling codes (e.g., uplink codes for uplink resources) may be provided by the Node B 12 to the UE 10 via a channel such as, for example, a PRACH. In this regard, for example, each of the different scrambling codes may be associated with a separate and distinct set of resources, by the Node B 12, for provision to the UE 10. In this manner, the processor 34 of the UE 10 may select one of the resources from the multiple sets of resources (e.g., 32 10 ms TTI resources on one scrambling code, 32 10 ms TTI resources on a different scrambling code, etc.) on the respective scrambling codes and may send the selected resource in a request to the Node B 12. In response to receiving the request, the processor 24 of the Node B 12 may provide the selected resource to the UE 10 for usage to facilitate communications of data (e.g., uplink data).

By utilizing different scrambling codes associated with different sets of resources, the example embodiments are not limited to providing 32 resources to the UE 10 to enable the UE 10 to select one of the resources from the set of 32 resources. Instead, an unlimited number of resources may be provided, by the Node B 12, to the UE 10 for selection of a resource from one of the multiple sets of resources associated with respective scrambling codes. For purposes of illustration and not of limitation, all 2 ms TTI resources may be on linked to or associated with one scrambling code and all 10 ms TTI resources may be on, linked to or associated with another scrambling code.

In one example embodiment, in response to determining to deny a selected resource request by UE 10, the Node B 12 may determine to provide an indication(s) (e.g., a command) of a resource to utilize to each of the UE's 10 of a system (e.g., the system of FIG. 1) in system information as opposed to sending the indicated resource or set of resources to a specific UE(s) 10. Additionally or alternatively, the processor 24 of the Node B 12 may broadcast to each UE 10 of a system, via broadcast system information, some of the resources for selection and may provide other resources for selection to specific UEs 10 via a PRACH procedure in response to sending the specific UEs 10 a NACK message or an E-AI signature denying a selected requested resource.

The Node B 12 may achieve this utilizing two different scrambling codes in which one of the scrambling codes and its associated resources may be transmitted to each of the UEs 10 of a system in the system information and by using the second scrambling code and its associated resources which are broadcast/provided to specific UEs 10.

Referring now to FIG. 4, a diagram illustrating an example manner in which to override a selection of resources and provide an indication of one or more different resources for selection is provided. In the example embodiment of FIG. 4, the UE 10 may measure its initial uplink power for an uplink communication and may determine that the power (e.g., $P_O$=Preamble_Initial_Power) is below a predetermined threshold (e.g., Threshold for 2 ms/10 ms TTI selection). In response to determining that the power of the UE 10 is below the predetermined threshold, the processor 34 of the UE 10 may generate a request for a selection of a resource such as, for example, a 2 ms TTI resource, and may send this request to the Node B 12 by performing a physical random access procedure on a PRACH.

In response to receiving the request from the UE 10 for the 2 ms TTI resource, the Node B 12 may deny the request for the 2 ms TTI resources (for example, there may be no 2 ms TTI resources available or the power of the UE 10 may not be as accurate/good as the UE 10 indicated or for any other suitable reasons). In response to determining to deny the request, the Node B 12 may generate a NACK message that is sent to the UE 10 on an AICH using an E-AI signature corresponding to the signature used for the preamble. In this regard, for example, the Node B 12 may send a signature corresponding to the signature sent by the UE 10 and some of the signatures (e.g., up to 16) may indicate a selection of a 2 ms resource. The modulation symbol may include a common E-DCH resource index (e.g., up to 32).

In one example embodiment, the NACK message may be interpreted by the UE 10 as instructing the UE 10 to select another resource (e.g., a 10 ms TTI resource) and to abort the current preamble procedure associated with the selection of the 2 ms TTI resource. In this example, one of the 32 resources (e.g., E-AI values) may be reserved for explicitly indicating the fallback command to abort the current PRACH procedure. For instance, detection of a symbol denoting a NACK may implicitly denote/indicate to the UE 10 to fallback/abort the current PRACH procedure for the requested resource and select a designated/indicated resource or a resource from another set of resources. In an alternative example embodiment, the NACK may be designated or denoted by a reserved E-AI an E-AI value indicating to the UE 10 to fallback and abort the current PRACH procedure.

The resource or the alternative set of resources (e.g., up to 32 resources) provided by the Node B 12 to the UE 10 from which the UE 10 may select one of the resources may be pre-configured by the Node B 12 and may be sent by the Node B 12 with an ACK message corresponding to the alternative set of resources. The alternative set of resources may be provided by the Node B 12 to the UE 10 via a PRACH.

While reattempting to select a designated resource or a resource from the alternative set of resources (e.g., a 10 ms TTI resource) indicated by the Node B 12 (e.g., in response to receipt of the NACK), the processor 34 of the UE 10 may make a selection for the resource and may measure its current power to determine the Preamble_Initial_Power for a new PRACH procedure. In addition, in response to receipt of this request for the resource (e.g., a 10 ms TTI resource) that the Node B 12 instructed the UE 10 to select or to select from a set of resources, the Node B 12 may provide the selected resource (e.g., the 10 ms TTI resource) to the UE 10 for usage to facilitate communications.

Referring now to FIG. 5, a flowchart is provided of an example method for overriding a requested selection of a resource and providing a designated resource or set of resources for usage according to an example embodiment. At operation 500, an apparatus (e.g. UE 10) may select a communication channel resource type (e.g., a 2 ms TTI (e.g., a first timing parameter)) associated with a first set of resources (e.g., 2 ms TTI resources and/or 10 ms TTI resources)) based in part on determining that a predetermined condition is met (e.g., an initial uplink power, amount of data in a buffer for uplink, etc.). At operation 505, an apparatus (e.g., UE 10) may provide a generated message, to a network device (e.g., Node B 12), requesting usage of the selected communication channel resource type.

At operation 510, an apparatus (e.g., UE 10) may receive a response, from the network device, denoting denial of the request for the usage of the selected communication channel resource type. At operation 515, an apparatus (e.g., UE 10) may select another communication channel resource type (e.g., a 10 ms TTI (e.g., a second timing parameter)) associated with a second set of resources (e.g., 10 ms resources and/or 2 ms TTI resources)), enabling provision of a generated request, to the network device (e.g., Node B 12). The generated request may request usage of the other communication channel resource type.

Referring now to FIG. 6, a flowchart is provided of an example method for overriding a selected resource and providing a designated resource or a set of resources for usage according to an example embodiment. At operation 600, an apparatus (e.g., Node B 12) may receive a message, from a device (e.g., UE 10), indicating a selection of a communication channel resource type (e.g., a 2 ms TTI (e.g., a first timing parameter)) associated with a first set of resources (e.g., 2 ms TTI resources and/or 10 ms TTI resources)) in which the device (e.g., UE 10) determined that a predetermined condition is met (e.g., an initial uplink power, amount of data in a buffer for uplink, etc.). The message may include data requesting usage of the selected communication channel resource type. At operation 605, an apparatus (e.g., Node B 12) may provide a generated message, to the device, denoting denial of the request for the usage of the selected communication channel resource type.

At operation 610, an apparatus (e.g., Node B 12) may receive a response message from the device (e.g., UE 10) indicating a selection of another communication channel resource type (e.g., a 10 ms TTI (e.g., a second timing parameter)) associated with a second set of resources (e.g., 10 ms TTI resources and/or 2 ms TTI resources) in response to the denial. The response message may include data requesting usage of the other communication channel resource type. Optionally, at operation 615, the apparatus (e.g., Node B 12) may enable provision of the other communication channel resource type to the device to enable the device to communicate via the other communication channel resource type. The apparatus (e.g., Node B 12) may enable provision of the other communication channel resource type based in part on detecting the data requesting usage of the other communication channel resource type.

It should be pointed out that FIGS. 5 and 6 are flowcharts of a system, method and computer program product according to an example embodiment of the invention. It will be understood that each block of the flowcharts, and combinations of blocks in the flowcharts, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory 26, memory 36) and executed by a processor (e.g., processor 24, processor 34). As will be appreciated, any such computer program instructions may be loaded onto a computer or other programmable apparatus (e.g., hardware) to produce a machine, such that the instructions which execute on the computer or other programmable apparatus cause the functions specified in the flowcharts blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowcharts blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts blocks.

Accordingly, blocks of the flowcharts support combinations of means for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In an example embodiment, an apparatus for performing the methods of FIGS. 5 and 6 above may comprise a processor (e.g., the processor 24, processor 34) configured to perform some or each of the operations (500-515, 600-615) described above. The processor may, for example, be configured to perform the operations (500-515, 600-615) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (500-515, 600-615) may comprise, for example, the processor 24 (e.g., as means for performing any of the operations described above), the processor 34 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method of configuring wireless communication resources within a user device, the method comprising:
   causing a selection of an uplink communication channel resource type associated with a first set of resources based in part on determining that a predetermined condition is met;
   enabling provision of a generated message, to a network device, requesting usage of the selected uplink communication channel resource type;
   receiving a response, from the network device, denoting denial of the request for the usage of the selected uplink communication channel resource type; and causing a selection of another uplink communication channel resource type associated with a second set of resources, enabling provision of a generated message, to the network device, requesting usage of the another uplink communication channel resource type.

2. The method of claim 1, wherein:
the first set of resources comprises resources comprising a first timing parameter and the second set of resources comprises resources comprising a second timing parameter; and
the selected uplink communication channel resource type and the another uplink communication channel resource type comprises common enhanced dedicated channel resources.

3. The method of claim 2, wherein:
the first timing parameter comprises a 2 millisecond enhanced transmission time interval, and the selected uplink communication channel resource type corresponds to a 2 millisecond enhanced transmission time interval resource; and
the second timing parameter comprises a 10 millisecond common enhanced dedicated channel transmission time interval, and the another uplink communication channel resource type corresponds to 10 millisecond common enhanced dedicated channel transmission time interval resources.

4. The method of claim 2, further comprising aborting a current procedure for requesting the selected uplink communication channel resource type in response to a detection of the received response.

5. The method of claim 4, wherein the detection comprises detecting an extended acquisition indicator signature and modulation symbol corresponding to a negative acknowledgment in the response denoting the denial or an extended acquisition indicator signature and a modulation symbol corresponding to a reserved enhanced dedicated channel resource index or reserved signature denoting the denial.

6. The method of claim 2, wherein prior to causing the selection of another uplink communication channel resource type, the method further comprises:
receiving an indication of one or more other communication channel resources associated with the second set of resources, and wherein
the other communication channel resources or an alternate set of communication channel resources comprises a plurality of sets of communication channel resources in which each of the sets of the communication channel resources is associated with or linked to respective scrambling codes.

7. The method of claim 6, wherein:
a first set of the sets of communication channel resources comprises thirty two communication channel resources; and
a second set of the sets of communication channel resources comprises thirty two alternative communication channel resources.

8. The method of claim 6, wherein the selection of the another uplink communication channel resource type comprises selecting the another uplink communication channel resource type from one of the sets of communication channel resources.

9. The method of claim 1, wherein:
receiving the response comprises receiving the response from the network device in response to a determination that one or more common enhanced dedicated channel resources associated with a timing parameter are unavailable; and
the another uplink communication channel resource type comprises a physical random access channel based on the determination that the enhanced dedicated channel resources are unavailable.

10. The method of claim 1, wherein:
receiving the response comprises receiving the response via an acquisition indicator channel.

11. An apparatus for use in configuring wireless communication resources, the apparatus comprising a user device and further comprising a processing system arranged to cause the apparatus to:
cause selection of an uplink communication channel resource type associated with a first set of resources based in part on determining that a predetermined condition is met;
enable provision of a generated message, to a network device, requesting usage of the selected uplink communication channel resource type;
receive a response, from the network device, denoting denial of the request for the usage of the selected uplink communication channel resource type; and
cause selection of another uplink communication channel resource type associated with a second set of resources, enabling provision of a generated message, to the network device, requesting usage of the another uplink communication channel resource type.

12. The apparatus of claim 11, wherein:
the first set of resources comprises resources comprising a first timing parameter and the second set of resources comprises resources comprising a second timing parameter; and
the selected uplink communication channel resource type and the another uplink communication channel resource type comprise common enhanced dedicated channel resources.

13. The apparatus of claim 12, wherein:
the first timing parameter comprises a 2 millisecond enhanced transmission time interval, and the selected uplink communication channel resource type corresponds to a 2 millisecond enhanced transmission time interval resource; and
the second timing parameter comprises a 10 millisecond common enhanced dedicated channel transmission time interval, and the another uplink communication channel resource type corresponds to 10 millisecond common enhanced dedicated channel transmission time interval resources.

14. The apparatus of claim 12, wherein the processing system is arranged to cause the apparatus to:
abort a current procedure for requesting the selected uplink communication channel resource type in response to a detection of the received response.

15. The apparatus of claim 14, wherein the processing system is arranged to cause the apparatus to:
identify the detection by detecting an extended acquisition signature and a modulation symbol corresponding to a negative acknowledgment in the response denoting the denial or an extended acquisition indicator signature and a modulation symbol corresponding to a reserved enhanced dedicated channel resource index or a reserved signature denoting the denial.

16. The apparatus of claim 12, wherein prior to causing the selection of another uplink communication channel resource type, the processing system is arranged to cause the apparatus to:

receive an indication of one or more other communication channel resources associated with the second set of resources, and wherein the other communication channel resources or an alternate set of communication channel resources comprises a plurality of sets of communication channel resources in which each of the sets of the communication channel resources is associated with or linked to respective scrambling codes.

17. The apparatus of claim 16, wherein:

a first set of the sets of communication channel resources comprises thirty two communication channel resources; and a second set of the sets of communication channel resources comprises thirty two alternate communication channel resources.

18. The apparatus of claim 16, wherein the selection of the another uplink communication channel resource type comprises selecting the another uplink communication channel resource type from one of the sets of communication channel resources.

19. The apparatus of claim 11, wherein the processing system is arranged to cause the apparatus to:

receive the response by receiving the response from the network device in response to a determination that one or more common enhanced dedicated channel resources associated with a timing parameter are unavailable, and wherein the another uplink communication channel resource type comprises a physical random access channel based on the determination that the enhanced dedicated channel resources are unavailable.

20. The apparatus of claim 11, wherein the processing system is arranged to cause the apparatus to:

receive the response by receiving the response via an acquisition indicator channel.

21. The apparatus of claim 11, wherein the apparatus comprises a mobile terminal and the network device comprises a base station.

22. A method of configuring wireless communication resources at a network device, the method comprising:

receiving a message, from a user device, indicating a selection of an uplink communication channel resource type associated with a first set of resources in which the user device determined that a predetermined condition is met, the message comprising data requesting usage of the selected uplink communication channel resource type;

enabling provision, via a processor, of a generated message, to the user device, denoting denial of the request for the usage of the selected uplink communication channel resource type; and receiving a response message from the user device indicating a selection of another uplink communication channel resource type, by the user device, associated with a second set of resources in response to the denial, the response message comprising data requesting usage of the another uplink communication channel resource type.

23. The method of claim 22, further comprising:

enabling provision of the another uplink communication channel resource type to the device, to enable the device to communicate via the another communication channel resource, based in part on detecting the data requesting usage of the another uplink communication channel resource type.

24. The method of claim 22, wherein:

the first set of resources comprises resources comprising a first timing parameter and the second set of resources comprises resources comprising a second timing parameter; and the selected uplink communication channel resource type and the another uplink communication channel resource type comprises common enhanced dedicated channel resources.

25. The method of claim 24, wherein:

the first timing parameter comprises a 2 millisecond enhanced transmission time interval, and the selected uplink communication channel resource type corresponds to a 2 millisecond enhanced transmission time interval resource; and the second timing parameter comprises a 10 millisecond common enhanced dedicated channel transmission time interval, and the another uplink communication channel resource type corresponds to 10 millisecond common enhanced dedicated channel transmission time interval resources.

26. The method of claim 24, further comprising designating that the denial instructs the device to abort a current procedure for requesting the selected uplink communication channel resource type in response to a detection of the generated message.

27. The method of claim 26, further comprising:

defining the denial to comprise data identifying an extended acquisition signature and a modulation symbol corresponding to a negative acknowledgement in the generated message to denote the denial or an extended acquisition indicator signature and a modulation symbol corresponding to a reserved enhanced dedicated channel resource index or a reserved signature denoting the denial.

28. The method of claim 24, further comprising:

assigning other communication channel resources or an alternate set of communication channel resources to comprise a plurality of sets of communication channel resources in which each of the sets of the communication channel resources is associated with or linked to respective scrambling codes; and enabling provision of the communication channel resources or the alternate set of communication channel resources to the user device.

29. The method of claim 28, wherein:

a first set of the sets of communication channel resources comprises thirty two communication channel resources; and a second set of the sets of communication channel resources comprises thirty two alternate communication channel resources.

30. The method of claim 28, wherein receiving the response message comprises receiving the response message indicating the selection of the another uplink communication channel resource type from the device in response to the device selecting the another uplink communication channel resource type from one of the sets of communication channel resources.

31. A network apparatus for use in configuring wireless communication resources, the network apparatus comprising a processing system arranged to cause the network apparatus at least to:

receive a message, from a user device, indicating a selection of an uplink communication channel resource type associated with a first set of resources in which the user device determined that a predetermined condition is met, the message comprising data requesting usage of the selected uplink communication channel resource type;

enable provision of a generated message, to the user device, denoting denial of the request for the usage of the selected uplink communication channel resource type; and receive a response message from the user device indicating a selection of another uplink communication channel resource type, by the user device, associated with a second set of resources in response to the denial, the response message comprising data requesting usage of the another uplink communication channel resource.

32. The apparatus of claim 31, wherein the processing system is arranged to cause the apparatus to:
enable provision of the another uplink communication channel resource type to the user device, to enable the user device to communicate via the another uplink communication channel resource type, based in part on detecting the data requesting usage of the another uplink communication channel resource type.

33. The apparatus of claim 31, wherein:
the first set of resources comprises resources comprising a first timing parameter and the second set of resources comprises resources comprising a second timing parameter; and
the selected uplink communication channel resource type and the another uplink communication channel resource type comprises common enhanced dedicated channel resources.

34. The apparatus of claim 33, wherein:
the first timing parameter comprises a 2 millisecond enhanced transmission time interval, and the selected uplink communication channel resource type corresponds to a 2 millisecond enhanced transmission time interval resource; and
the second timing parameter comprises a 10 millisecond common enhanced dedicated channel transmission time interval, and the another uplink communication channel resource type corresponds to 10 millisecond common enhanced dedicated channel transmission time interval resources.

35. The apparatus of claim 33, wherein the processing system is arranged to cause the apparatus to:
designate that the denial instructs the user device to abort a current procedure for requesting the selected uplink communication channel resource type in response to a detection of the generated message.

36. The apparatus of claim 35, wherein the processing system is arranged to cause the apparatus to:
define the denial to comprise data identifying an extended acquisition signature and a modulation symbol corresponding to a negative acknowledgement in the generated message to denote the denial or an extended acquisition indicator signature and a modulation symbol corresponding to a reserved enhanced dedicated channel resource index or a reserved signature denoting the denial.

37. The apparatus of claim 33, wherein the processing system is arranged to cause the apparatus to:
assign other communication channel resources or an alternate set of communication channel resources to comprise a plurality of sets of communication channel resources in which each of the sets of the communication channel resources is associated with or linked to respective scrambling codes; and enabling provision of the communication channel resources or the alternate set of communication channel resources to the user device.

38. The apparatus of claim 37, wherein:
a first set of the sets of communication channel resources comprises thirty two communication channel resources; and
a second set of the sets of communication channel resources comprises thirty two alternate communication channel resources.

39. The apparatus of claim 37, wherein the processing system is arranged to cause the apparatus to:
receive the response message by receiving the response message indicting the selection of the another uplink communication channel resource type from the user device in response to the user device selecting the another uplink communication channel resource type from one of the sets of communication channel resources.

40. The apparatus of claim 31, wherein the apparatus comprises a base station and the user device comprises a mobile terminal.

41. A computer program product comprising computer program code for use in configuring wireless communication resources, the program code comprising a set of instructions, which, when executed by a computing system comprising a user device, causes the computing system to perform the steps of:
causing a selection of an uplink communication channel resource type associated with a first set of resources based in part on determining that a predetermined condition is met;
enabling provision of a generated message, to a network device, requesting usage of the selected uplink communication channel resource type;
receiving a response, from the network device, denoting denial of the request for the usage of the selected uplink communication channel resource type; and
causing a selection of another uplink communication channel resource type associated with a second set of resources, enabling provision of a generated request, to the network device, requesting usage of the another uplink communication channel resource type.

42. A computer program product comprising computer program code for use in configuring wireless communication resources at a network device, the program code comprising a set of instructions, which, when executed by a computing system comprising the network device, causes the computing system to perform the steps of:
receiving a message, from a user device, indicating a selection of an uplink communication channel resource type associated with a first set of resources in which the user device determined that a predetermined condition is met, the message including data requesting usage of the selected uplink communication channel resource type;
enabling provision of a generated message, to the user device, denoting denial of the request for the usage of the selected uplink communication channel resource type; and
receiving a response message from the user device indicating a selection of another uplink communication channel resource type, by the user device, associated with a second set of resources in response to the denial, the response message including data requesting usage of the another uplink communication channel resource type.

* * * * *